United States Patent
Beam, Jr.

[15] 3,683,512
[45] Aug. 15, 1972

[54] HAIR DRYING APPARATUS FOR DOGS AND THE LIKE

[72] Inventor: Harry J. Beam, Jr., 719 Creighton Ave., Dayton, Ohio 45420

[22] Filed: Dec. 20, 1970

[21] Appl. No.: 96,981

Related U.S. Application Data

[63] Continuation of Ser. No. 779,876, Nov. 29, 1968, abandoned.

[52] U.S. Cl. .....................34/243, 119/83, 219/370
[51] Int. Cl. ..............................................F26b 19/00
[58] Field of Search ......34/98, 210, 243; 119/83, 85; 219/369, 370, 371; 237/14

[56] References Cited

UNITED STATES PATENTS

| | | | |
|---|---|---|---|
| 2,122,964 | 7/1938 | Sweetland | 34/243 X |
| 2,038,228 | 4/1936 | Leslie | 34/DIG. 24 |
| 3,418,452 | 12/1968 | Grabner | 219/370 |
| 1,931,339 | 10/1933 | Zingone | 34/98 |
| 2,537,330 | 1/1951 | Carroll | 219/370 |

Primary Examiner—Frederick L. Matteson
Assistant Examiner—Harry B. Ramey
Attorney—Irvin V. Gleim

[57] ABSTRACT

Portable apparatus for drying the hair of dogs and the like which includes a drier for supplying heated air under pressure to a plenum chamber for distribution through flexible hoses. The apparatus may be supported on top of a tier of cages or may be positioned elsewhere in the vicinity of the animal to be dried or fluff dried while grooming. Air distribution means is provided at the distal end of the hoses together with a means for releasably securing the air distribution means to the side of a selected cage or grooming area.

3 Claims, 3 Drawing Figures

Patented Aug. 15, 1972

INVENTOR.
HARRY J. BEAM, JR.

BY
ATTORNEY

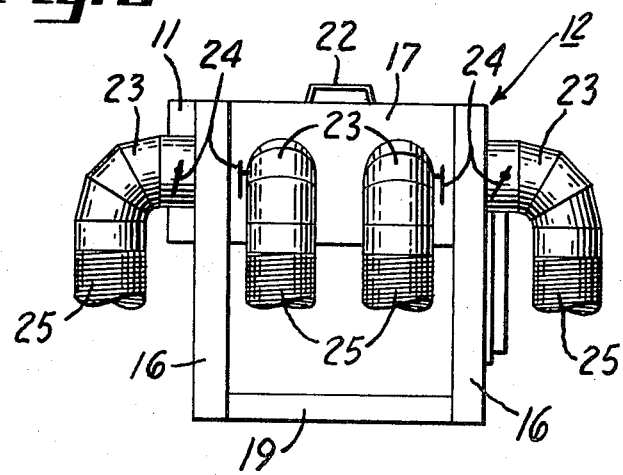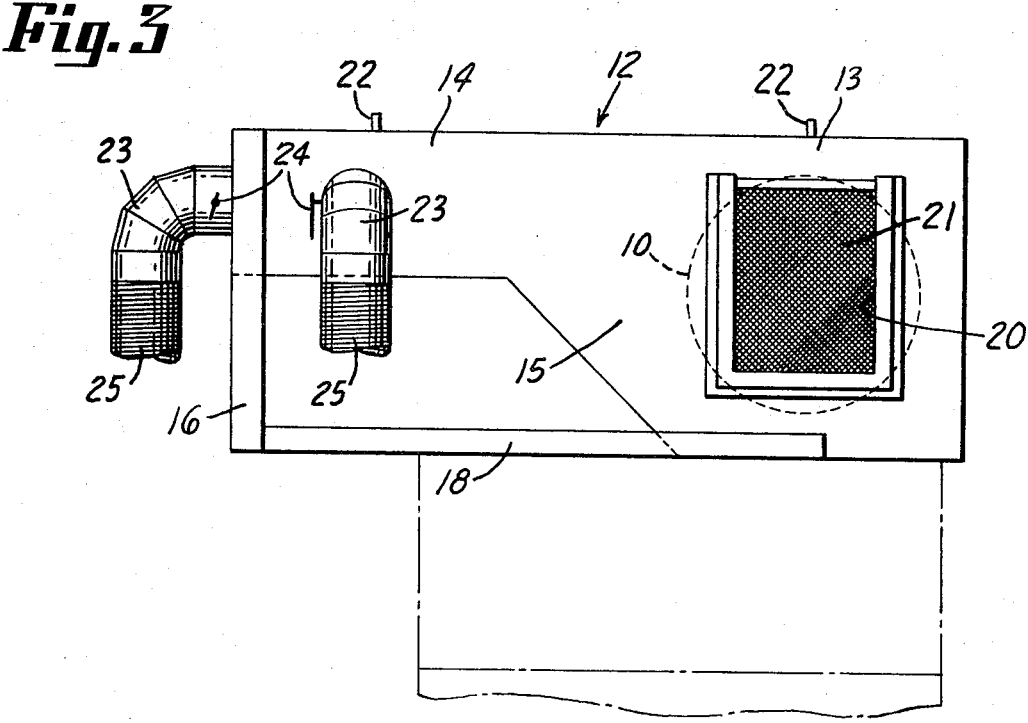

HAIR DRYING APPARATUS FOR DOGS AND THE LIKE

This application is a continuation of application Ser. No. 779,876 filed Nov. 29, 1968, now abandoned.

BACKGROUND OF THE INVENTION

This invention relates to the grooming of animals and, more particularly, to apparatus for drying the hair of dogs and the like after bathing the animal.

Grooming of long haired animals and particularly dogs is difficult and time consuming so that many dog owners are hesitant to undertake this task. Even veterinarians and people operating dog hospitals and kennels experience difficulty in finding enough time to suitably bathe, cage and/or fluff dry and groom an animal such as a dog prior to its return to its owner.

Accordingly, an object of the present invention is to provide means for drying a dog and the like subsequent to a bathing operation thereby permitting veterinarians or kennel personnel to attend to other duties while the animal is being dried.

Another object of the invention is to provide portable drying apparatus that is readily movable to various desired locations, is readily supported on top of a tier of animal cages, if desired, during use, thus providing ready access to substantially the entire aisle passageways between tiers of cages, and is selectively connectable to a number of different cages within a tier of cages without necessarily requiring relocation of the entire apparatus.

Still another object of the invention is to provide drying apparatus that is of mechanically simple construction, relatively light in weight, and easy to operate without requiring special training of or skill of operating personnel.

DESCRIPTION

Other objects and advantages will become apparent from the following description taken in connection with the accompanying drawings in which:

FIG. 2 is an end elevation of the embodiment of FIG. 1; and,

FIG. 3 is a side elevation of the embodiment of FIG. 1.

Figure 1:
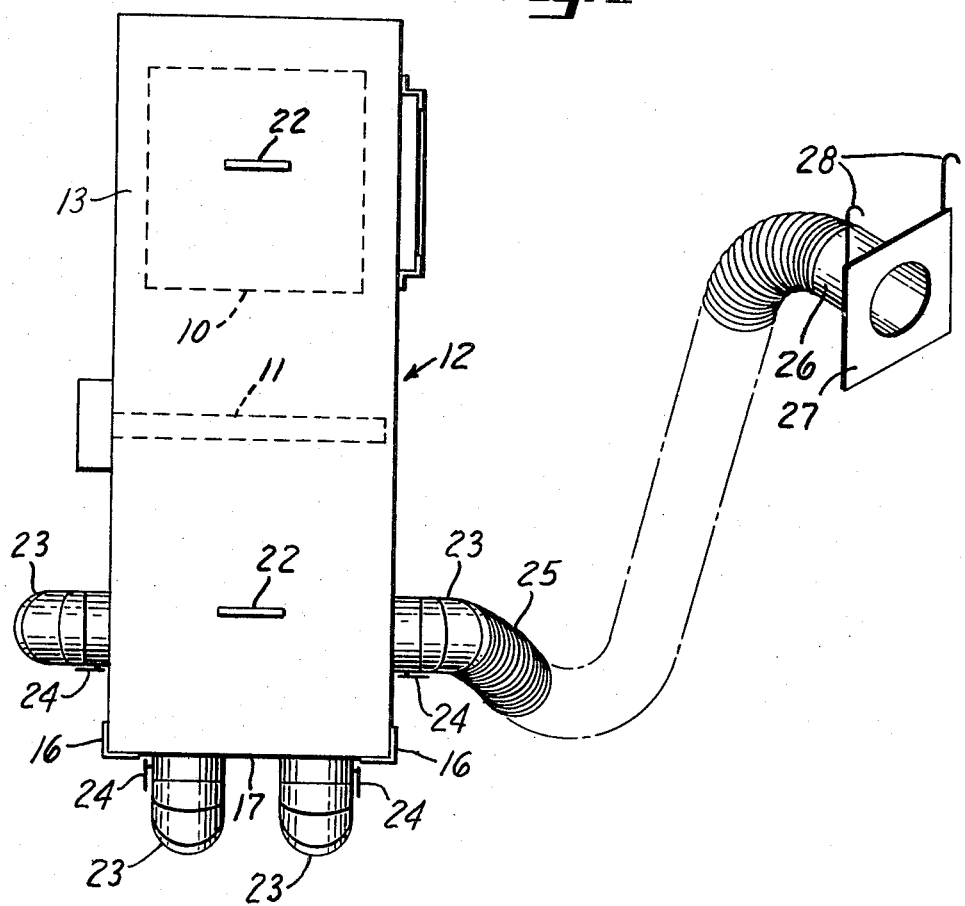
FIG. 1 is a top plan view, partly broken, showing drying apparatus embodying the present invention.

Referring to the drawings, drier apparatus embodying the present invention includes a blower 10 and a heating element 11 enclosed within a housing indicated generally at 12.

Housing 12 includes a blower enclosing portion, a plenum chamber 14, and a transition portion 15 connecting the plenum chamber to the blower. Air discharged by blower 10 is warmed somewhat by the compressing action of the blower and is further heated by heating element 11 as the air passes from blower enclosing portion 13 and through transition portion 15. Thus, heated air under pressure is continuously supplied to plenum chamber 14 during operation of the device.

In order to provide adequate support from a relatively flat supporting surface, upright support members 16 are connected to plenum chamber 14 adjacent the end walls 17 thereof and are also connected to horizontally extending members 18 which in turn are connected to blower enclosing portion 13. Cross member 19 extends between and is connected to horizontally extending members 18.

As used herein, the term blower includes a suitable means such as an electric motor for driving the blower. Conveniently, a squirrel cage type of blower 10 may be employed although the invention is not necessarily limited to such type of blower.

As is best illustrated in FIG. 1, in order to facilitate lifting and moving of the apparatus to and from various desired locations, a pair of handles 22 are secured to the top of housing 12 with one of said handles being positioned closely adjacent the location of the center of gravity of blower 10.

In one side of housing portion 13 there is provided an opening 20 through which air may be drawn into blower 10. If desired, opening 20 may be protected by an air filter 21 in order to minimize the entry of dust and other foreign matter with the air drawn into blower 10.

At or adjacent end wall 17 of plenum chamber 14 there are provided a plurality of pipe elbows 23 each having therein a damper 24 for individually controlling the flow of heated air from chamber 14 through the several elbows 23. A flexible hose 25 is connected to each of the pipe elbows 23 as is best shown in FIG. 2. At the distal ends of hoses 25 there is connected an air distribution nozzle 26. At the discharge edge of each nozzle 26 there is connected thereto a plate member 27 to which a pair of hook members 28 are connected.

It is contemplated that suitable devices to control the operation of blower 10 and heating element 11 will be provided. However, since such controls and the electrical connections between them and their respective controlled elements are known and are not necessary to an understanding of the present invention, they are not shown but customarily, the heating element and the blower may employ 220 volts. However, it is important to note that it is an advantage of the inventive structure described above that all such controls may be mounted on a panel which in turn can be secured to upright members 16 thus providing for ready accessibility to such controls by operating personnel.

In operation, the apparatus may be placed upon and supported by the top of a tier of animal cages. If a pipe elbow 23 and its connected hose 25 is provided at the side or sides of plenum chamber 14, the apparatus is positioned with the end portion of the plenum chamber 14 overhanging the front wall of the tier of cages with the hoses 25 thereby hanging freely in front of said wall, as is best shown in FIG. 3 in which the front and rear walls of the tier of cages are shown in phantom lines. Alternatively, if all of the pipe elbows 23 are mounted on end wall 17, the front wall of the cages can be positioned substantially in line with the front face of upright members 16 and end wall 17 since the elbows will then overhang the front of said wall.

From the foregoing description, use and operation of the device should be readily apparent. With blower 10 and heating element 11 in operation, heated air will be delivered from plenum chamber 14 through elbows 23 and hose 25 to a corresponding nozzle 26 and may be directed into the interior of a selected cage for drying a dog or other animal confined therein merely by securing hooks 28 to the wires comprising the front wall of the cages so as to direct the heated air distributed by nozzle 26 into the desired cage. The drying apparatus may be supported by or positioned on the top of a tier of cages in a very stable manner in view of the fact that the center of gravity of the drier apparatus is located very near blower 10 which is disposed very near the rear wall of the cages.

While particular embodiments of the invention have been illustrated and described, it will be obvious to those skilled in the art that various changes and modifications may be made without departing from the invention, and it is intended in the appended claims to cover all such changes and modifications that fall within the true spirit and scope of the invention.

What is claimed is:

1. Portable apparatus for rapidly and safely drying and/or grooming the hair of a living animal such as canines and the like comprising in combination blower means including a blower housing and operable to supply a continuous volume of air under pressure, walls defining a plenum chamber spaced apart from said housing, means connecting said chamber to said housing in air-receiving relationship, heating means interposed between said housing and said chamber, means integrating the aforementioned elements into a unitary and portable structure and including frame means integrally connecting said chamber to said housing, and air distribution means including flexible hose means connected at one end to said chamber and having nozzle means connected to the distal end thereof for selectively directing a volume of heated air against the coat of an animal to be dried without injury to the said animal.

2. Apparatus according to claim 1 and additionally including a carrying handle connected to said apparatus.

3. Apparatus according to claim 1 wherein a plurality of flexible hose means are individually connected to said plenum chamber.

* * * * *